Sept. 23, 1952 D. COUQUELET 2,611,217
APPARATUS FOR THE MANUFACTURE OF GLASS ARTICLES
Filed June 12, 1950
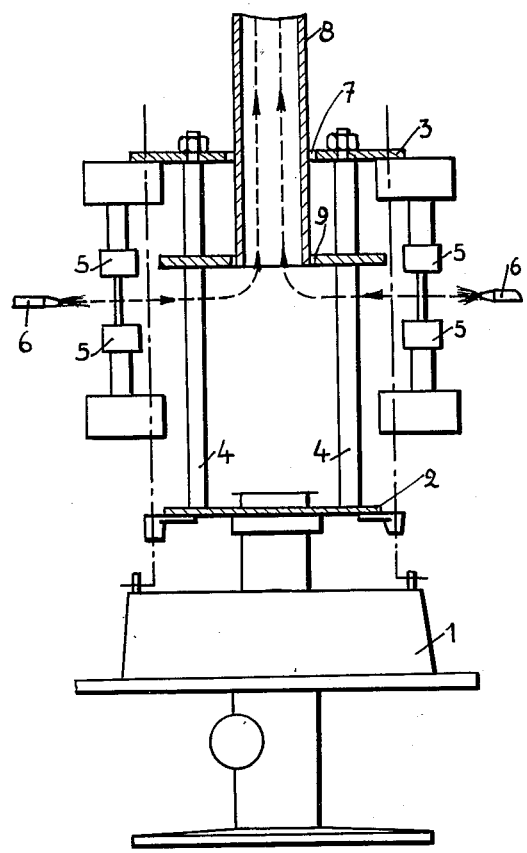
INVENTOR.
DIEUDONNÉ COUQUELET
BY Wenderoth, Lind & Ponack
ATTORNEYS.

Patented Sept. 23, 1952

2,611,217

UNITED STATES PATENT OFFICE 2,611,217

APPARATUS FOR THE MANUFACTURE OF GLASS ARTICLES

Dieudonné Couquelet, Liege, Belgium

Application June 12, 1950, Serial No. 167,655
In Belgium June 27, 1949

3 Claims. (Cl. 49—7)

This invention is concerned with improvements in or relating to apparatus for the manufacture of glass articles such as ampoules for pharmaceutical and like preparations.

Rotary machines for the manufacture of ampoules are known which comprise a rotor formed by two plates braced apart and a series of blow pipes for heating the tubes of glass so disposed as to form the ampoules. The flames of these blow pipes are directed towards the centre. These machines however have a disadvantage due to the fact that on account of the concentric heating, the heat not absorbed in the glass work heats the upper plate considerably so that the axes of rotation of the tops of the work deform and thus prevent the manufacture of uniform ampoules.

According to the present invention there is provided a rotary ampoule manufacturing machine in which means are provided for the removal of the lost heat.

According to one feature of the invention I provide in the upper part of the machine an exhaust chimney for the hot gases originating from the blow pipes, the flames of which are directed towards the axis of rotation of the machine.

According to another feature of the invention the chimney mounted on the axis of the rotation is provided at its base with a deflector member fixed to the supporting members of the upper plate.

Other features will be apparent from the following description of the accompanying drawing, which shows by way of example only one embodiment of apparatus according to the invention.

The drawing is a diagrammatic elevation in part section.

A machine for the manufacture of glass ampoules, comprises essentially a base 1 supporting a rotor formed from two plates 2 and 3 connected by struts such as those at 4. On the upper plate there are mounted work heads such as shown at 5 in which the tubes from which the ampoules are formed are mounted. These work heads, actuated in a known manner with a rotary and a linear movement, are moved so as to bring the appropriate parts of the tubes into contact with blow pipes similar to those shown diagrammatically at 6 and which blow pipes are fixed with respect to the base 1.

According to the present invention there is provided in the upper plate 3 an aperture 7 through which passes a chimney 8 having on its lower portion a deflector 9 in the form of an annular disc. The chimney is fixed by this deflector to the struts 4. It will be noted that the body of the chimney has a diameter less than that of the aperture of the plate so that there will be a jacket of air to prevent the transmission by conduction of the heat carried by the hot gases emanating from the blow pipes, collected by the deflector and escaping through the chimney.

A chimney construction according to the invention is advantageous in that it avoids the heating of the upper plate, and only the supporting struts become slightly heated and undergo a longitudinal expansion which does not however detract from the satisfactory operation of the machine in the production of ampoules.

The heat lost in operation is collected by the chimney and may be recovered in a heat exchanger and may be used for local heating or any other purpose.

What I claim is:

1. A rotary machine for the manufacture of glass ampoules comprising, a rotor having two plates, struts for securing one plate to the other, work heads mounted on the upper plate for maintaining the tubes of glass from which the ampoules are formed, a series of concentrically arranged blow pipes for heating said tubes of glass so as to form the ampoules, an aperture centrally located in the upper plate of the rotor and a chimney extending into said aperture for removing the lost heat during operation.

2. A rotary machine for the manufacture of glass ampoules comprising a rotor having two plates, struts for securing one plate to the other, work heads mounted on the upper plate for maintaining the tubes of glass from which the ampoules are formed, a series of concentrically arranged blow pipes for heating said tubes of glass so as to form the ampoules, an aperture centrally located in the upper plate of the rotor, a chimney extending into said aperture, a deflector at the base of said chimney for directing lost heat into said chimney and for securing it to said struts.

3. A rotary machine for the manufacture of glass ampoules comprising, a rotor having two plates, struts for securing one plate to the other, work heads mounted on the upper plate for maintaining the tubes of glass from which the ampoules are formed, a series of concentrically arranged blow pipes for heating said tubes of glass so as to form the ampoules, an aperture centrally located in the upper plate of the rotor, a chimney extending into said aperture, a deflector at the base of said chimney for directing lost heat into said chimney and for securing it to said struts, said aperture in said upper plate having a diameter greater than that of said chimney so as to provide an air jacket for preventing heat transmission by conduction.

DIEUDONNÉ COUQUELET.

REFERENCES CITED

The following references are of record in the file of this patent:

UNITED STATES PATENTS

| Number | Name | Date |
|---|---|---|
| 1,984,488 | Mulder | Dec. 18, 1934 |
| 2,050,088 | Dichter | Aug. 4, 1936 |

FOREIGN PATENTS

| Number | Country | Date |
|---|---|---|
| 852,138 | France | Oct. 16, 1939 |